United States Patent
Kooijman et al.

(10) Patent No.: US 8,070,141 B2
(45) Date of Patent: Dec. 6, 2011

(54) FLUID INLET DEVICE, USE, AND METHOD OR RETROFITTING

(75) Inventors: Hendrik Adriaan Kooijman, Amsterdam (NL); Johannes Lambertus Nooijen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 780 days.

(21) Appl. No.: 12/097,925

(22) PCT Filed: Nov. 21, 2006

(86) PCT No.: PCT/EP2006/068728
§ 371 (c)(1),
(2), (4) Date: Jun. 18, 2008

(87) PCT Pub. No.: WO2007/071514
PCT Pub. Date: Jun. 28, 2007

(65) Prior Publication Data
US 2008/0290532 A1    Nov. 27, 2008

(30) Foreign Application Priority Data

Dec. 20, 2005  (EP) ..................................... 05112532

(51) Int. Cl.
*C10J 1/08*  (2006.01)
(52) U.S. Cl. ......... 261/108; 261/112.1; 95/260; 95/262; 95/267; 95/271; 95/272; 96/204; 96/206; 96/207; 96/209; 96/213
(58) Field of Classification Search .................... 95/260, 95/262, 267, 271, 272; 96/204, 206, 207, 96/209, 213; 261/108, 112.1
See application file for complete search history.

(56) References Cited

U.S. PATENT DOCUMENTS

| | | | |
|---|---|---|---|
| 3,938,972 A | 2/1976 | Sugimura | 55/440 |
| 4,266,603 A | 5/1981 | Germann | 165/171 |
| 4,543,108 A | 9/1985 | Wurz | 55/1 |
| 4,767,424 A | 8/1988 | McEwan | 55/184 |

(Continued)

FOREIGN PATENT DOCUMENTS

DE    102004018341    11/2005

(Continued)

OTHER PUBLICATIONS

Internals for Packed Columns with No. 22.51.06.40-III.06-50, by Sulzer Chemtech, on p. 18.

*Primary Examiner* — Robert J Hill, Jr.
*Assistant Examiner* — Christopher P Jones
(74) *Attorney, Agent, or Firm* — Charles W. Stewart

(57) ABSTRACT

A fluid inlet device (1) suitable for introducing a mixture of liquid and gas into a vessel, which fluid inlet device comprises a guide member having a surface on which surface a liquid film is present during normal operation, and having a main direction of gas flow along the surface; and wherein the guide member (20) is provided with a liquid catcher channel (40) extending from an upstream position with respect to the guide member (20) to a downstream position, and wherein a virtual line along the guide member between the upstream position and the downstream position deviates from the main direction of gas flow; the use of the fluid inlet device for introducing a mixture of liquid and gas into a gas-liquid contacting vessel; and a method of retrofitting a fluid inlet device.

13 Claims, 9 Drawing Sheets

U.S. PATENT DOCUMENTS

| | | | | |
|---|---|---|---|---|
| 4,990,167 | A | 2/1991 | Stehning | 55/257.1 |
| 5,269,823 | A | 12/1993 | Wurz | 55/440 |
| 6,083,291 | A | 7/2000 | Okada et al. | 55/337 |
| 7,276,210 | B2 | 10/2007 | Cerqueira et al. | 422/144 |
| 7,281,702 | B2 | 10/2007 | Jacobs et al. | 261/79.2 |
| 7,459,001 | B2 | 12/2008 | Christiansen et al. | 55/343 |
| 7,488,361 | B2 * | 2/2009 | Larnholm | 55/318 |
| 2007/0044437 | A1 * | 3/2007 | Larnholm et al. | 55/319 |
| 2008/0290532 | A1 | 11/2008 | Kooijman et al. | 261/108 |
| 2009/0078118 | A1 * | 3/2009 | Kooijman | 96/207 |

FOREIGN PATENT DOCUMENTS

| | | |
|---|---|---|
| EP | 195464 | 9/1986 |
| GB | 1119699 | 7/1968 |
| WO | WO02074404 | 9/2002 |
| WO | WO03070348 | 8/2003 |
| WO | WO2005018780 | 3/2005 |
| WO | WO2005058503 | 6/2005 |

* cited by examiner

FLUID INLET DEVICE, USE, AND METHOD OR RETROFITTING

The present application claims priority of European Patent Application No. 05112532.6 filed 20 Dec. 2005.

FIELD OF THE INVENTION

The present invention relates to a fluid inlet device suitable for introducing a mixture of liquid and gas into a vessel, to the use of such a device, and to a method of retrofitting a fluid inlet device.

BACKGROUND OF THE INVENTION

In many installations in the upstream or downstream oil and gas industry, chemical and petrochemical industry, it is required to introduce a mixture of liquid and gas into a processing vessel. The vessel can be a separation vessel designed to separate the stream, e.g. a natural gas stream comprising oil and/or water, into liquid and gas streams. The vessel can also be a gas/liquid contacting vessel in which gas and liquid are counter-currently contacted to exchange heat or matter. An example of such a gas/liquid contacting vessel is a fractionation or distillation column, and a particular example is a vacuum distillation column.

In the specification and in the claims the word 'gas' is used to refer to gas and to vapour.

In order to introduce a mixture of gas and liquid into a column or vessel, so-called inlet devices are used. There are different types of inlet devices, varying in complexity and performance. Some inlet devices comprise or essentially consist of a splash plate, which is arranged in the flowpath of the mixture that flows into the column via an inlet nozzle. The splash plate breaks the momentum of the inflowing stream, and guides and deflects fluids laterally, to achieve some distribution of the inflowing mixture in the column.

Other inlet devices are designed such that a substantial (pre-)separation of liquid and gas is achieved, in particular employing centrifugal force on curved guiding vanes.

British patent specification No. 1 119 699 discloses a particular fluid inlet device for introducing a mixture of liquid and gas into a distillation column.

The known fluid inlet device comprises an inlet flow channel having an inlet end for receiving the mixture of liquid and gas, and a plurality of curved guiding vanes placed one behind the other along the inlet flow channel, wherein each vane comprises an intercepting part extending towards the inlet end of the inlet flow channel, and an outwardly directed deflecting part. The intercepting and deflecting parts of each vane are arranged in such a way that the vane intercepts and deflects part of the mixed feed stream, and is capable of effecting a separation between liquid and vapour by inertia and centrifugal force.

During normal operation a mixture of gas and liquid is supplied to the inlet nozzle of a column, which is in fluid communication with the inlet end of the inlet device. The vanes are curved so as to deflect the mixture outwardly. The change in the direction of flow causes a (pre-)separation of the mixture in that liquid is forced onto the concave surface of the vane thereby forming a liquid-rich film streaming on the concave surface, and a gas-rich stream in the remainder of the outlet channel between two vanes. After the streams have left the outlet channel, the liquid-rich stream moves downwards in the column under the influence of gravity, whereas the gas-rich stream flows upwards in the column. In a specific embodiment of the known device a liquid catching channel is arranged at the trailing rim of the vane perpendicular to the main flow direction along the vane. This channel serves to discharge all of the liquid that is separated by the vane sideways, i.e. perpendicular to the main flow direction.

Another inlet device with curved guiding vanes is for example a so-called vapour horn, e.g. as shown in the brochure "Internals for packed columns" with Number 22.51.06.40-III.06-50, by Sulzer Chemtech, on page 18 as GITV Cyclon inlet. In a vapour horn, the fluid mixture is introduced tangentially into the column, and a curved inlet flow channel extends along the inner circumference of the column. Curved guiding vanes along the curved channel pre-separate and deflect parts of the mixture towards the centre of the column.

The same page 18 in the Sulzer brochure also shows a GDP Splash plate inlet device and a GIV vane inlet device.

Yet another inlet device with curved guiding vanes is known from International Patent application with publication No. WO 03/070348.

An important parameter of a flow inlet device is the total remaining liquid entrainment in the gas, i.e. the remaining liquid content of the gas flowing into the column or vessel, typically upwards. In inlet devices including a guide member such as a splash plate or in particular a curved guiding vane, a smaller or larger part of the liquid content is precipitated onto the guide member and flows on a surface of the guide member into the column. However, part of the already separated liquid is re-entrained, which re-entrainment occurs generally in the region where gas and liquid streams leave the inlet device.

Re-entrainment is a general concern, including in distillation and separation applications, since it presents a larger liquid load to downstream equipment. Re-entrainment lowers the overall separation efficiency of the inlet device, since liquid that was already separated on the concave side of the vane, and that should ideally find its way towards the bottom of the vessel, is still carried upwardly with the gas. Generally, re-entrainment is expected to increase at high velocities, which are e.g. the consequence of minimization of vessel size in view of cost and area occupied, e.g. on an offshore installation.

It is desired to be able to operate with lower entrainment than possible with present inlet devices.

SUMMARY OF THE INVENTION

In accordance with the present invention there is provided a fluid inlet device suitable for introducing a mixture of liquid and gas into a vessel,
which fluid inlet device comprises
a guide member having a surface on which surface a liquid film is present during normal operation, and having a main direction of gas flow along the surface;
and wherein the guide member is provided with a liquid catcher channel extending from an upstream position with respect to the guide member to a downstream position, and wherein a virtual line along the guide member between the upstream position and the downstream position deviates from the main direction of gas flow.

Applicant has realized that a significant mechanism of re-entrainment of already separated liquid into gas occurs at the rims of the known inlet devices, such as at the trailing end of the deflecting part of a curved vane.

This re-entrainment is caused by gas flowing across a rim, where a liquid film is present on the guide member and/or from which rim liquid leaves the vane.

Most of the gas in the inlet device known from GB 1 119 699 flows across the end rim of the vane, which is vertical when the main gas flow is generally horizontal. In prior art it has been attempted to lower entrainment by placing of a vertical liquid catcher channel along the vertical trailing rim, e.g. in GB 1 119 699 and in International Patent Application publication No. WO 2005/018780. Applicant has found, however, that the presence of such vertical structures itself is a cause of re-entrainment, due to the disturbance of the gas flow by the perpendicular orientation with regard to the main direction of gas flow. Also, Applicant has found that there is an upwards force on liquid in vertical catcher channels, which can lead to liquid being pushed out of the upper part of the vertical channel and re-entrained, even though the upper end of the channel is closed.

German Patent application No. DE 10 2004 018 341 A1 discloses a generally horizontal vane inlet device in which liquid catcher pockets are arranged along the upper horizontal rims of the vanes. The liquid catcher pockets extend in line with the main direction of gas flow. In contrast thereto, the liquid catcher channels of the present invention do not extend in line with the main direction of gas flow.

Applicant has further realized that a liquid catcher channel is a suitable means for preventing re-entrainment. Liquid is caught and at least partially guided towards a side of the vane by the catcher rim, so that at least part of the gas is not cross-flowing over a rim from which liquid can be carried away. The expression liquid catcher channel is to include any means that forces liquid flow on the vane to deviate from the main direction of gas flow in the direction as defined by a channel-like structure.

In a particular class of embodiments the inlet device is a vane type inlet device. Such a fluid inlet device has an inlet end for receiving the mixture of liquid and gas; wherein the guide member is a curved guiding vane comprising an intercepting part extending towards the inlet end, and a deflecting part defining a generally convex side and a generally concave side of the curved vane, the concave side representing the surface on which liquid is present during normal operation.

In a particular embodiment the fluid inlet device has a curved inlet flow channel with the inlet end at its upstream end; and a plurality of curved guiding vanes placed one behind the other along the curved inlet flow channel, and wherein at least one of the vanes is provided with a liquid catcher channel.

It is also possible that the fluid inlet device has an inlet flow channel with the inlet end at its upstream end; and a plurality of curved guiding vanes placed one behind the other along the inlet flow channel, wherein the deflecting parts of two consecutive vanes form an outlet channel of the inlet device, and wherein at least one of the vanes is provided with a liquid catcher channel.

In a further embodiment the fluid inlet device comprises a plurality of curved guiding vanes of which the deflecting parts extend into a plurality of different directions, and wherein at least one of the vanes is provided with a liquid catcher channel.

In another class of embodiments the guide member is a splash plate.

Suitably the virtual line deviates from the main direction of gas flow by an angle of at most 75 degrees or less, preferably 65 degrees or less. At higher angles than 75 degrees the chance for re-entrainment by disturbance of the gas flow and/or by liquid being pushed out of the catcher channel in upward direction becomes too high. Suitably the angle is at least 10 degrees or more, preferably 20 degrees or more, more preferably 30 degrees or more such as 35 degrees or more.

Suitably at least the upstream position of the catcher channel is substantially at a rim of the guide member, in particular at a rim of a vane. The upstream end can extend somewhat outside of the guide member.

Preferably the liquid catcher channel extends along at least part of a rim of the guide member.

In a particular embodiment the main direction of gas flow during normal operation is horizontal, and guide member, in particular the deflecting part of a vane, extends between upper and lower rims, the upstream position is at a first distance from the lower rim, and the downstream position is at a second, smaller, distance from the lower rim.

In a particular embodiment the fluid inlet device comprises walls defining a box-like structure, wherein the liquid catcher channel is arranged on a part of the vane extending out of the box-like structure, and wherein catcher channel at its upstream position is sealingly arranged with respect to one of the walls.

Suitably the width of the guide member, in particular of the deflecting part of a vane, decreases in downstream direction.

In a particular embodiment a plurality of liquid catcher channels is arranged on the guide member.

In a further particular embodiment two liquid catcher channels are arranged that deviate in different directions from the main direction of gas flow. This embodiment can be of particular use if the vanes in the fluid inlet device are arranged with their outlet channels opening downwardly, so that e.g. liquid can be guided by two liquid catcher channels towards the centreline of the vane.

The guide member is typically a plate having a side on which a liquid film is formed during normal operation and an opposite rear side. In one type of embodiment the liquid catcher channel can extend from a first channel rim at the rear side, in particular behind the convex side of a curved vane, to a second channel rim in the plane of the surface on which the liquid film is formed, in particular the deflecting part of the vane, or beyond that plane, in particular towards the concave side of the vane.

The channel rim behind the rear side, in particular a convex surface of a curved vane, can be attached to the rear side, in particular sealingly attached or connected.

It is also possible that the longitudinal channel rim behind the rear side forms a slit with the rear side. In such an embodiment, if the rim is an upper rim of the guide member, the captured liquid will still be carried and discharged along the channel, but gas can escape downwardly through the slit. If the rim is a lower rim, a slit can provide an overflow outlet in cases where the liquid catcher channel could be filled full with liquid.

In another type of embodiment the liquid catcher channel is connected to or integrally formed with the rim of the guide member.

Suitably also, the liquid catcher channel has a downstream end that extends until the downstream end of the trailing end of the guide member, or beyond the trailing end. By extending the liquid catcher channel beyond the guide member, the liquid can be guided into an area where the gas velocities are much smaller. The downstream part of the liquid catcher channel can also be arranged to alter the direction of liquid release into the vessel. For example, when the main flow direction in the fluid inlet device is horizontal, the downstream part can be directed downwards, albeit suitably not abruptly.

The channel can in particular be formed by an angled profile, e.g. of an inverted L, V or U shape. Another possibility is that the channel has the shape of a tubular section, which is a tubular of which a longitudinal part has been cut out along its length.

The fluid inlet device in accordance with the invention can be used as fluid inlet device into a gas-liquid contacting vessel, in particular into a distillation column, more in particular a high-vacuum distillation column, or into a separation vessel.

The invention further provides a method of retrofitting a fluid inlet device suitable for introducing a mixture of liquid and gas into a vessel, which fluid inlet device comprises a guide member having a surface on which surface a liquid film is present during normal operation, and having a main direction of gas flow along the surface;

which method comprises providing the guide member with a liquid catcher channel extending from an upstream position with respect to the guide member to a downstream position, and wherein a virtual line along the vane between the upstream position and the downstream position deviates from the main direction of gas flow.

Suitably this is done by connecting to the vane a vane end part wherein at least part of the liquid catcher channel is arranged on the vane end part.

Suitably the fluid inlet device after retrofitting is a fluid inlet device according to the invention.

BRIEF DESCRIPTION OF THE DRAWINGS

The invention will now be described in more detail and with reference to the accompanying drawings, wherein.

Where the same reference numerals are used in different Figures, sometimes with addition a character a,b,c,d,e, they refer to the same or similar objects.

DETAILED DESCRIPTION OF THE INVENTION

In the first part of the detailed description the invention will be discussed specifically in relation to improving a vane-type inlet device known from GB 1 119 699. In the second part the invention will be discussed more specifically in relation with other inlet devices.

Figure 1:
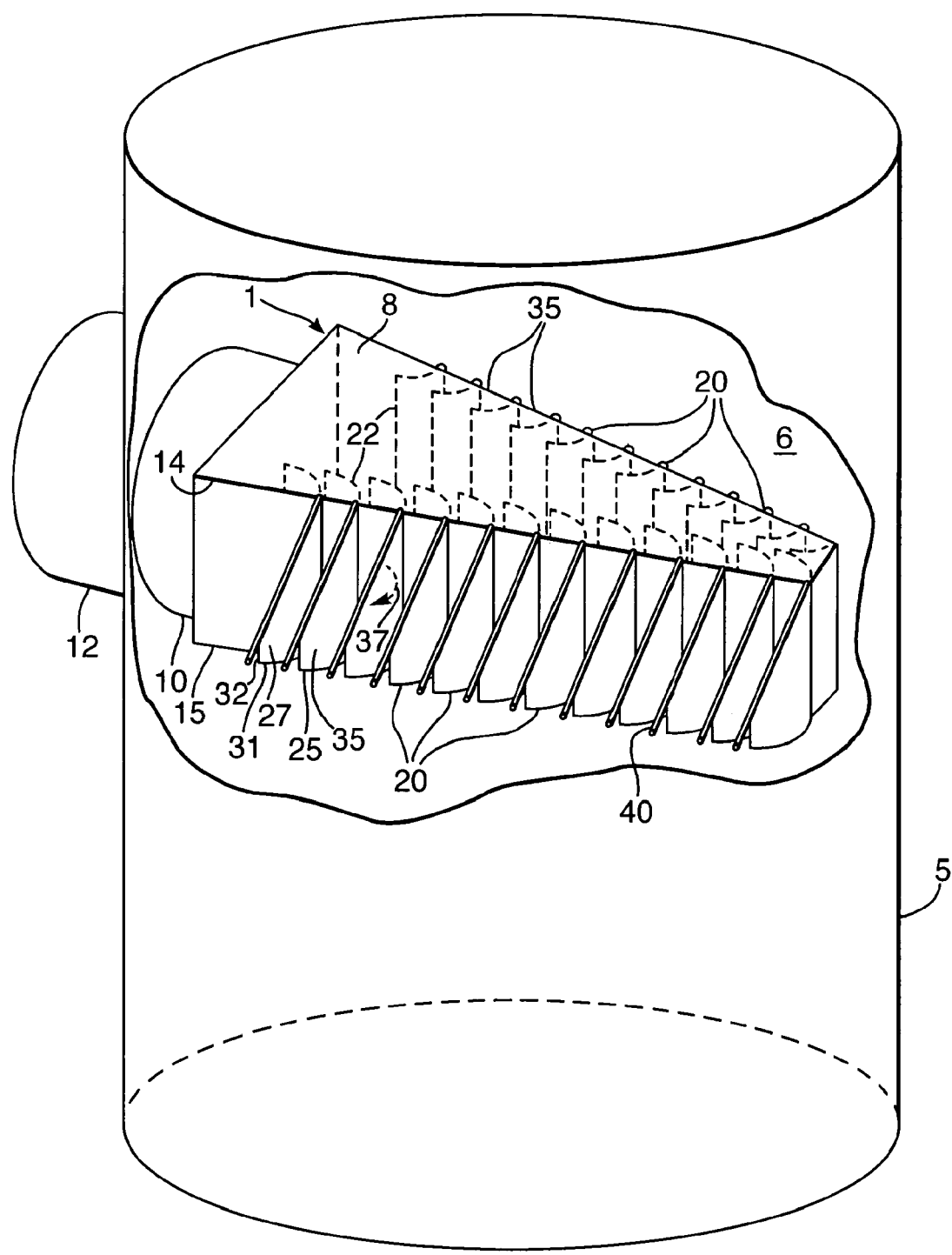
FIG. 1 shows schematically a first embodiment of a fluid inlet device in a vertical column.

Reference is made to FIG. 1 showing schematically a fluid inlet device 1 mounted in a vertical column 5, which serves to introduce a liquid/gas mixture pre-separated and relatively evenly distributed over the cross-section into a treatment zone 6 of the column.

The fluid inlet device 1 comprises an elongated inlet flow channel 8 having an inlet end 10 in fluid communication with an inlet nozzle 12 of the column 5, through which a mixture of liquid and gas can be received. The inlet flow channel of the shown embodiment extends horizontally in the vertical column 5 between upper and lower wall plates 14,15. Guide members in the form of curved guiding vanes 20 are placed one behind the other in two rows at either lateral side along the inlet flow channel 8, so that a box-like arrangement is obtained two sides of which are provided with a series of vanes. Each vane comprises an intercepting part 22 extending towards the inlet end 10 of the inlet flow channel, and an outwardly (out of the fluid inlet device into the vessel interior) directed deflecting part 25 having a trailing end 27 extending between an upper rim 30 and a lower rim 31 to a trailing rim 32. The trailing end is generally that downstream part where the majority of fluid separation has taken place, often it is the part extending out of the box-like structure defined by the walls 14,15.

The deflecting parts 25 define a convex and a concave side of each vane. The concave side in FIG. 1 is generally the side facing the inlet end of the fluid inlet device. The deflecting parts 25 of two consecutive vanes 20 form an outlet channel 35 of the inlet device. The outlet channel defines a main direction of gas flow 37 along the vanes, which is in the horizontal plane in the inlet device as shown. The leading and trailing ends of a vane can be planar, but each or both of them can also be curved.

The expression "main direction of gas flow" as used herein denotes the direction the gas flow will have during operation along the surface of the guide member on which a liquid film is present during normal operation, when the fluid inlet device is placed in a large open space, such that the path of the outflowing gas and liquid is not influenced by surrounding equipment. This surface is typically the concave side of curved guiding vanes. It will be clear that during operation in a vertical column the direction of gas flow in the outlet part of the vane may already be influenced by the pressure distribution in the column and the presence of a nearby column wall, in many cases the gas does not leave horizontally but with an upward velocity component, which will depend on the precise location of the vane in the column and on operating parameters.

The arrow 37 also generally indicates the downstream direction for a particular vane.

Examples of liquid catcher channels in accordance with the invention are generally indicated with reference numeral 40 in FIG. 1, and will be discussed in more detail with reference to FIGS. 2-8.

Other internals (not shown) can be arranged in the column 5 according to the specific application. In the case of a separation column, a one or more coalescing devices like a wire-mesh, vane pack, and/or a centrifugal liquid separator can be installed, e.g. in a configuration known from European Patent No. EP 0 195 464 B1.

In the case of installing the fluid inlet device in a high vacuum column, it can be installed underneath a wash bed.

During normal operation of the fluid inlet device 1 a mixture of gas and liquid is supplied through the inlet nozzle 12 via the inlet end 10 into the generally horizontally extending channel 8. Each of the vanes 20 intercepts part of the feed stream and deflects it laterally outwardly. The first vane on either side, i.e. the one nearest the inlet end 10 is so arranged in the mixed feed stream that it intercepts and deflects part of the latter, while the remaining part of the feed stream continues along the inlet channel 8. This remaining part meets successively the subsequent vanes each of which intercepts and deflects a portion of the feed stream; the leading edge of each subsequent vane is offset from the one before so that the stream becomes steadily smaller until it is finally caught and deflected by the last vanes.

Since the vanes have a curved shape the consequence of the inertia and centrifugal force is that the liquid particles strike the vane surface, and that a separation between liquid and vapour is simultaneously effected. The liquid collects to a considerable liquid stream on the concave surface of the vanes.

In the bilaterally operating embodiment shown in FIG. 1 the main flow direction of gas is generally in the horizontal plane.

Figure 2:
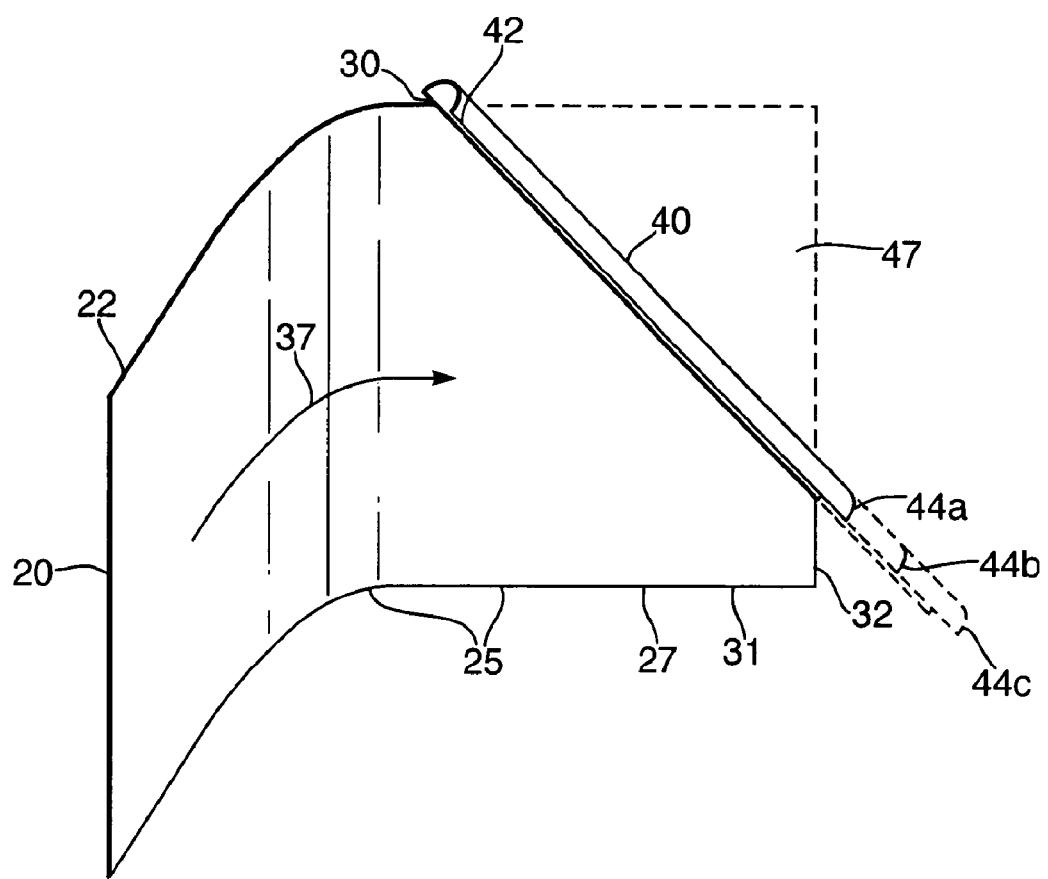
FIGS. 2-4 show schematically several embodiments of a vane in accordance with the present invention.

Reference is made to FIG. 2, showing an embodiment of a vane 20 in accordance with the present invention, in a perspective view onto the concave side of the vane.

The vane 20 has a straight intercepting part 22 and a deflecting part 25 comprising a curved part and a straight trailing end 27. The radius of curvature is generally chosen in dependence on the size of the inlet nozzle. The angle between upstream and training end is typically between 70 and 110 degrees, preferably between 80 and 100 degrees such as substantially 90 degrees. The liquid catcher channel 40 extends from an upstream position 42 on the vane 20, at the upper rim 30 thereof, to a downstream position 44a at the trailing rim 32. Upstream and downstream positions are separated along the main direction of gas flow 37. The channel can also extend over the trailing rim as indicated with dashed lines, to a downstream position 44b, which can even be located below the lower rim 31 as shown at 44c. The end part that extends over the trailing rim can also be partly curved, and/or guide the liquid out of the plane of the trailing end of the vane. Laterally further away from the fluid inlet device, local gas velocities are lower so that the chance of re-entrainment at that point is further minimized. The section extending beyond the trailing rim 32 of the vane is suitably formed by a fully enclosed tubular having an outlet at its end, but can of course also be left partly opened such as at its lower side. Bending of the part extending over the trailing rim such as downward bending can be of advantage at vanes ending close to the column wall, to suppress a mechanism of re-entrainment due to the impact of the liquid stream at high velocity onto the column wall.

The corner part 47 of the vane above the liquid catcher channel is preferably cut off, and therefore drawn with dashed lines, and in that case the liquid catcher channel runs along the upper rim of the vane. The width of the deflecting part of the vane then also decreases in downstream direction. The corner part 47 can however also remain in place.

The upstream position 42 is at a first distance from the lower rim 31, wherein distance is measured perpendicular to the direction 37. The downstream position is in all cases 44a,b,c at a smaller, distance from the lower rim, wherein it will be clear that a negative distance as in the case of position 44c is also a smaller distance.

In any case a virtual line along the vane between the upstream position 42 and the downstream position 44a,b,c deviates from the main direction of gas flow which is generally parallel with the lower rim 31.

The angle between the main direction of flow 37 and the virtual line, which is parallel with the straight liquid catcher channel 40 shown in FIG. 2, is suitably 10 degrees or more, preferably 20 degrees or more, such as 30 degrees or more, e.g. 45 degrees. The angle is suitably not larger than 75 degrees, preferably 65 degrees or less, such as 60 degrees or less.

Figure 3:
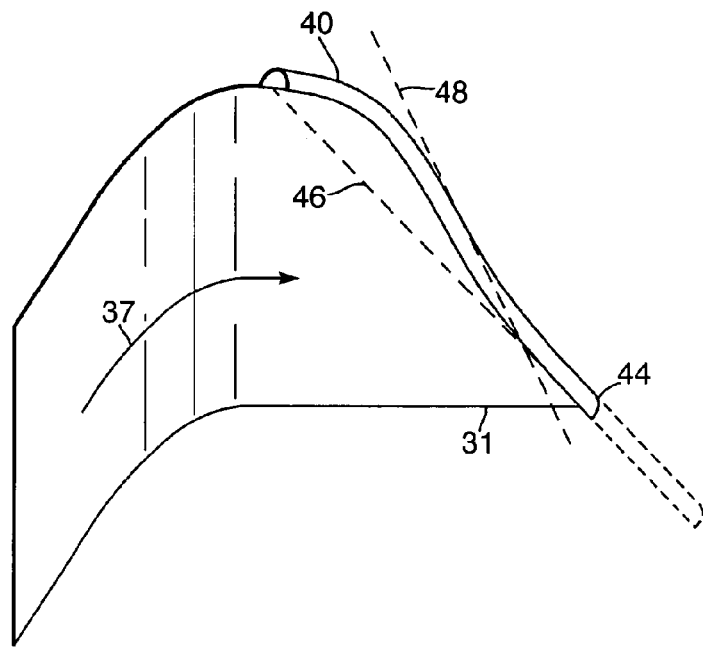

FIG. 3 shows an embodiment in which the catcher channel 40 is curved. The virtual line 46 is indicated. Preferably also the maximum angle formed by a tangential 48 of the curved catcher channel with the main flow direction 37 is suitably 10 degrees or more, preferably 20 degrees or more, such as 30 degrees or more, e.g. 45 degrees. The angle is suitably not larger than 80 degrees, preferably 75 degrees or less, more preferably 65 degrees or less, such as 60 degrees or less.

Another aspect of the embodiment of FIG. 3 is that the downstream position 44 of the catcher channel is on the lower rim 31, such that there is no finite end rim as shown at 32 in FIGS. 1 and 2. This aspect can of course also be applied in other embodiments such as that of FIG. 2.

Figure 4:
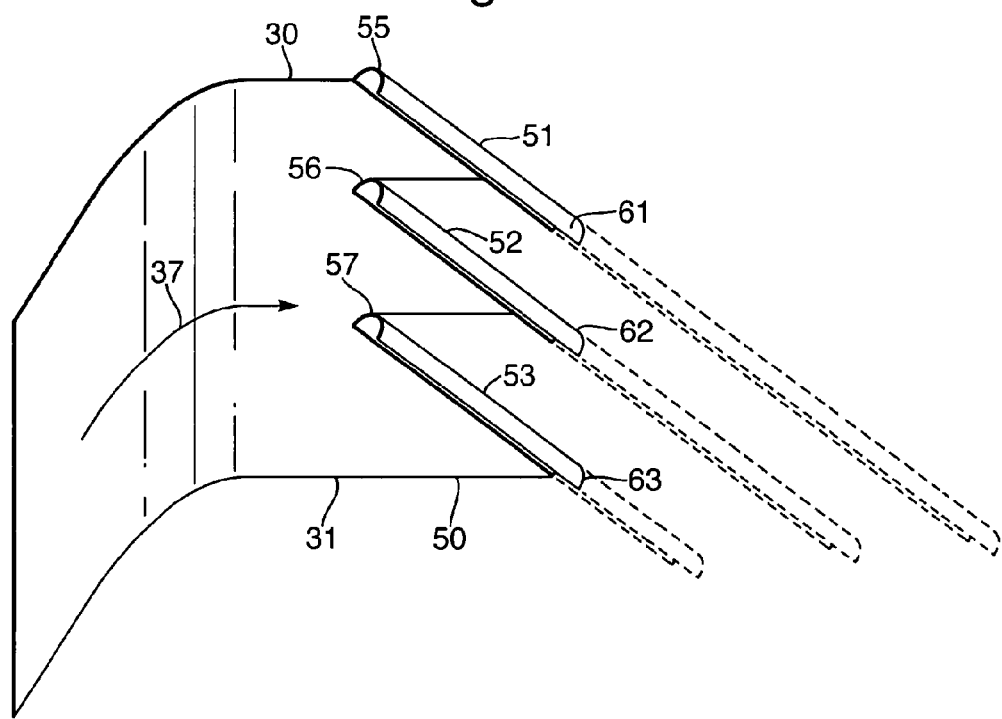

FIG. 4 shows another embodiment of a vane 50 according to the invention. If the vane is relatively high, there can be insufficient room to place catcher rims according to the invention on the vane at an angle that is not too steep. In this case, more than one catcher rim can be arranged, e.g. 2, 3, 4 or more. In the example of FIG. 4, three catcher rims 51,52,53 are shown, extending from upstream positions 55,56,57 to downstream positions 61,62,63. The upstream position of the highest catcher rim is at the upper rim 30 of the vane 50. Catcher channels overlap in the main direction of gas flow 37, such that the upstream position 56 of rim 52 is higher than the downstream position 61 of rim 51, and the upstream position 57 of rim 55 is higher than the downstream position 62 of rim 52. The generally triangular parts of the vane that are in the shadow of the catcher rims can be cut out as shown, but can also be present. The dashed lines beyond the downstream positions indicate that the catcher channels can be extended, as already discussed with reference to FIG. 1, for example such that they all release the liquid at the same vertical height, if the distance to the column wall permits. The channels and/or the possible end parts beyond the end of the vane do not necessarily need to run parallel as shown, and can be at least partly curved.

Fluid inlet devices sometimes comprise two or more stacked rows of curved vanes, for example in a so-called dual (or multiple) ladder configuration. This is typically done when otherwise the vanes would become too big for passing through a manhole for installation in a column. If vanes of different ladders in such a stack are provided with catcher channels according to the invention, a configuration similar to that of FIG. 4 is obtained.

Figure 5:
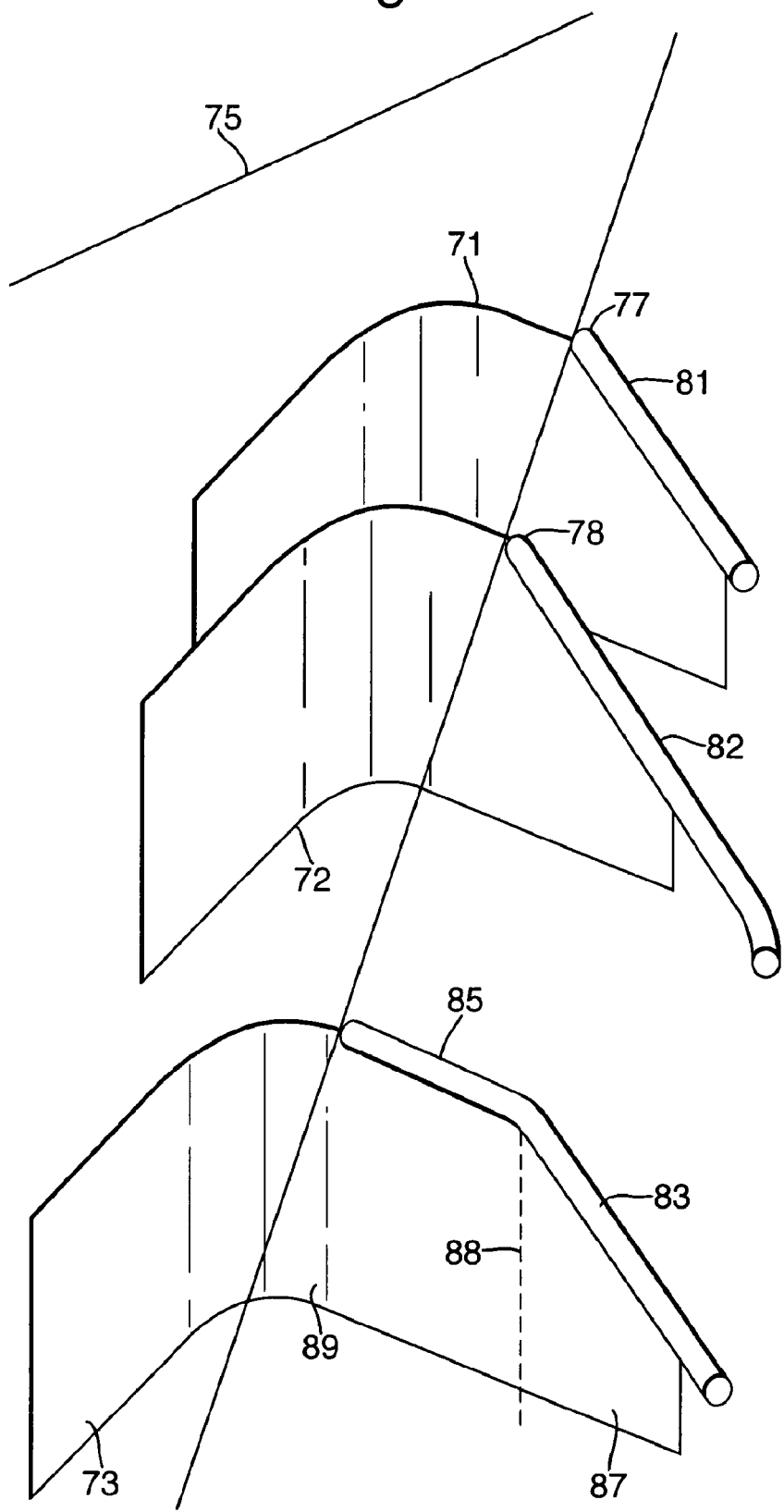
FIG. 5 shows schematically several vanes in accordance with the present invention.

Reference is now made to FIG. 5, showing schematically three curved vanes 71,72,73 mounted underneath a top wall plate 75 of a fluid inlet device. The upstream ends 77,78 of the catcher rims 81,82 of vanes 71,72 are arranged at the rim of the top plate 75. Preferably there is no passage for liquid from the vane between the top plate and the catcher channel. Suitably the upstream ends 77,78 are sealingly connected or attached to the top plate. In particular, the upstream end can be arranged under the top plate (including under a horizontal extension to the top plate), e.g. by cutting off the vane a little more to the inside and arranging the upstream end such that it fits against the top plate and can be welded thereto.

In vane 73 the catcher rim also extends from the position where the upper rim of the vane extends out of the top plate 75. The first part 85 of the catcher channel runs along the upper longitudinal rim of the vane 73, generally horizontal, before the catcher channel bends downwardly. The first part 85 can also be a separate conduit, or can be left out.

The end part 87 of the vane 83 beyond the dashed line 88 can be an extension of the vane 73 that is not integrally formed with the vane but connected to the upstream part 89. Such an end part can for example be mounted in the course of retrofitting an existing fluid inlet device in order to adapt/improve its performance. Connection can take place by any suitable method, e.g. welding. An upper longitudinal rim part 85 can also be mounted if desired. Alternatively, retrofitting can also be done by placing catcher rims on the existing vanes, suitably after cutting off corners.

Figure 6:
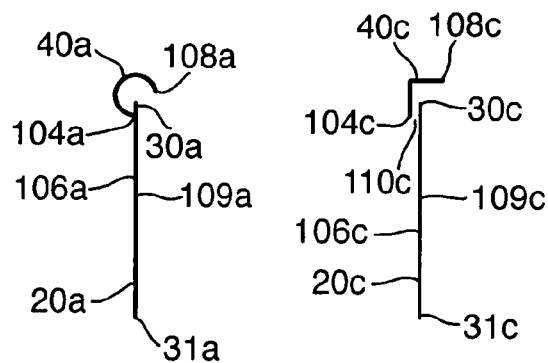
FIG. 6 shows schematically a cross-section through the trailing part of two vanes according to the invention.

Reference is now made to FIG. 6 showing a cross-section of two embodiments of vanes 20*a* and 20*c* through their respective trailing ends looking in upstream direction. Reference numerals introduced with reference to FIG. 1 are used accordingly. FIG. 6 illustrates a number of aspects of various embodiments of liquid catcher channels according to the invention.

Liquid catcher channel 40*a* is formed by a tubular section that extends from a first longitudinal channel rim 104*a* attached to the convex side 106*a* of the vane, to a second longitudinal channel rim 108*a* located beyond the upper rim 30*a* towards the concave side 109*a*, i.e. beyond the plane defined by the trailing end 27 of the curved vane.

Liquid that will be flowing along the main direction of gas flow will be catched in the channel and guided towards the downstream end of the liquid catcher channel 40*a*, and in this way the re-entrainment is suppressed.

The liquid catcher channel 40*c* is formed by an angled profile instead of a tubular section. The longitudinal channel rim 44*c* behind the vane is not connected to the convex surface 46*c*, so that a slit 110*c* is formed. The liquid catcher channel of this embodiment also catches the liquid, but gas can escape through the slit 110*c* downwardly.

It will be understood that the variants of liquid catcher channels shown at the upper rims can analogously be applied at rims having another orientation in the column. In addition to catcher channels that according to the invention are inclined with respect to the main direction of gas flow, also other catcher channels can be arranged, such as catcher channels that run longitudinally along, at least part of, an upper or a lower rim, generally parallel with the main direction of gas flow.

Although not shown in any of the Figures it is also possible that the liquid catcher cannel has its downstream end before the downstream end of the vane. This can for example be sufficient when the trailing end of the deflecting part of the vane extends far into the vessel, where the gas velocities are sufficiently low already upstream of the trailing rim of the vane.

Figure 7:
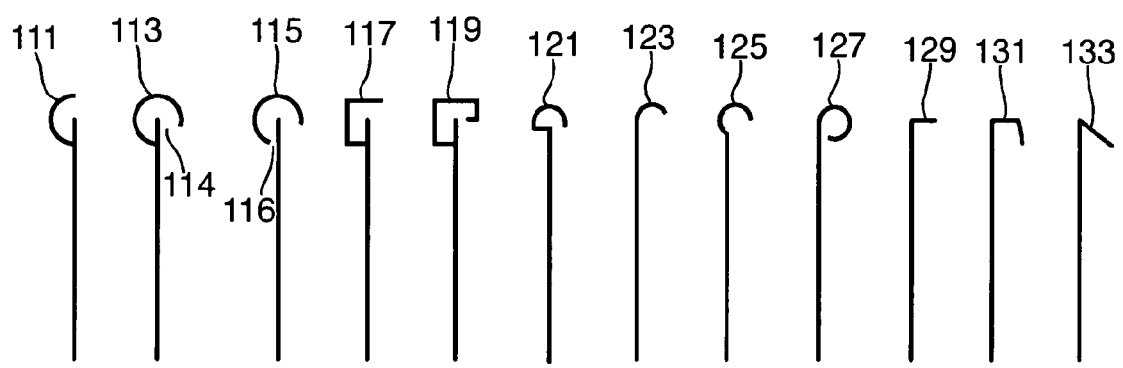
FIG. 7 schematically shows cross-sections through the trailing part of further vanes according to the invention.

Reference is made to FIG. 7 showing schematically a number of further embodiments of liquid catcher channels in a cross-section equal to that of FIG. 3.

Liquid catcher channel 111 is formed by a tubular section, generally similar to 40*a*, but the channel does extend until the plane defined by the trailing edge of the vane, and not over the longitudinal rim of the vane towards the concave side thereof.

Liquid catcher channel 113 on the other hand extends so far towards the concave side of the vane that only a relatively small inlet slit 114 is obtained.

Liquid catcher channel 115 is formed of a tubular section, however not connected, at least not over the entire length, to the convex surface of the vane so that a slit 116 is formed, similar in function to slit 110*c*.

Liquid catcher channels 117 and 119 are formed of angled profiles and are sealingly attached to the convex side of the vane.

Liquid catcher channel 121 is formed of an L profile to which a half circular tube section is connected.

It shall be understood that also in cases wherein the liquid catcher channel (tubular, angled profile or other) is connected to the convex surface of the vane, separate gas outlet openings can be arranged in the lower part of the channel behind the convex side if desired.

The liquid catcher channels 123,125,127,129,131 and 133 are all formed integrally with the vane, which can allow efficient and cost-effective manufacturing.

Preferably the intercepting part of each vane makes an angle with the direction of the main direction of flow through the inlet end. Suitably the angle is 10 degrees or less.

It will depend on specific aspects of a practical situation which type of liquid catcher channel will be selected.

In general the mutual distance between the vanes, measured on their outlet ends is preferably kept within certain limits. This distance is preferably not less than 5 cm and not more than 60 cm, for example approximately 10 cm or approximately 40 cm.

The maximum height (or width) of the vanes is selected according to the size of the inlet nozzle of the vessel, and is typically in the range of 10-80 cm. For larger inlet nozzles, dual or multiple vane ladders can be stacked as discussed above.

The selected size of the liquid catcher channel will depend mainly on the amount of liquid to be transported, which is particularly dependent on the inlet height of the vane. In the channels according to the invention in many cases the majority of liquid separated on the vane will have to be transported away, and the channel needs to be dimensioned for that. A typical dimension of the channel such as diameter of a tubular section or width or height of an angled profile will typically be in the range of 3 to 50 mm, suitably 5 to 30 mm, in particular in the range of 5 to 20 mm. Placing a channel at a rim as discussed hereinabove has the advantage that part of the channel can easily be arranged at the convex side of the vanes, where the channel least disturbs the gas flow, so that its extension towards the concave side, where the highest gas velocities prevail, can be minimized.

The liquid catcher channel has an inlet opening for liquid, preferably in the form of a longitudinal slit along the respective longitudinal rim of the vane, which inlet opening suitably has width of between 1 and 20 mm, preferably between 1 and 12 mm, more preferably between 2 and 10 mm.

The embodiment schematically shown in FIG. 1 is a typical arrangement for a vane-type fluid inlet device. However, apart from the type of fluid inlet device depicted in FIG. 1, fluid catcher channels according to the invention can also be applied to other types such as an embodiment as discussed with reference to FIGS. 1-3 of GB 1 119 699. In this embodiment the vanes are arranged in such a way that they all deflect the mixture feed stream to one side, the space on the other side of the vanes being bounded by a wall which is connected to the side walls so that a box-like arrangement is obtained, one side of which is formed by a series of vanes. The series of vanes can in this case have a downwards direction, so that the liquid phase flows down in a number of streams onto a tray below, or collects directly in the bottom part of the column. It is observed that FIGS. 4 and 5 of this GB patent specification are of the general type of present FIG. 1, however without fluid catcher channels according to the present invention.

Figure 8:
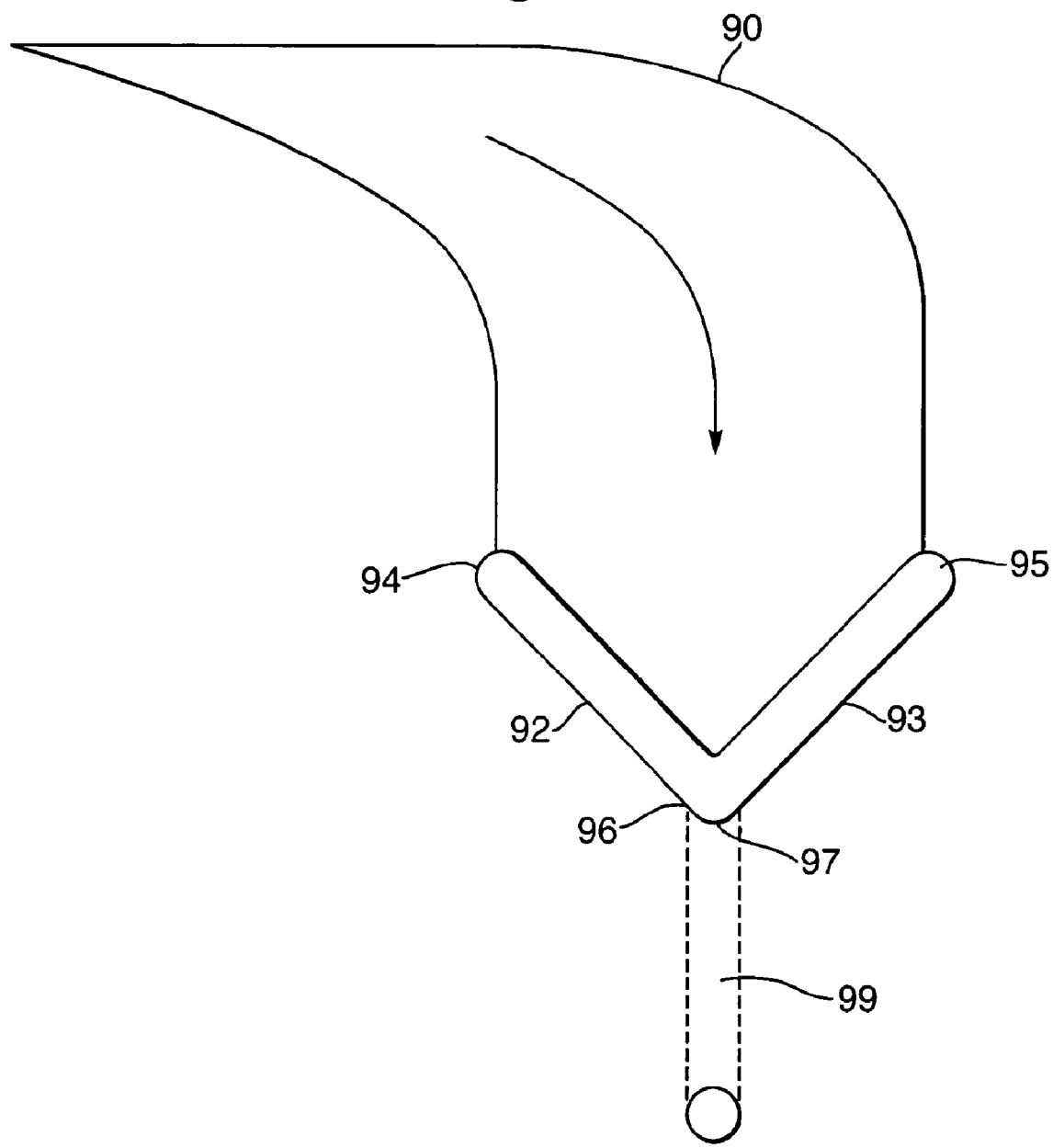
FIG. 8 schematically shows a further embodiment of a vane in accordance with the present invention.

Reference is now made to FIG. 8 showing a further embodiment of a vane in accordance with the invention. The vane 90 is particularly suitable for a downwards blowing fluid inlet device.

The vane 90 is provided with two catching channels 92,93, extending from two upstream positions 94,95, to downstream positions 96,97, which in the example as shown nearly coincide. It is moreover possible to arrange a common liquid guidance channel 99 as indicated, which van be straight as shown or curved towards a suitable outlet position. Analogously to the discussion with reference to FIG. 5 the upstream ends are preferably sealingly connected or attached to the walls/plates (not shown) defining the inlet channel.

Now the invention will be discussed in relation to other inlet devices.

Figure 9:
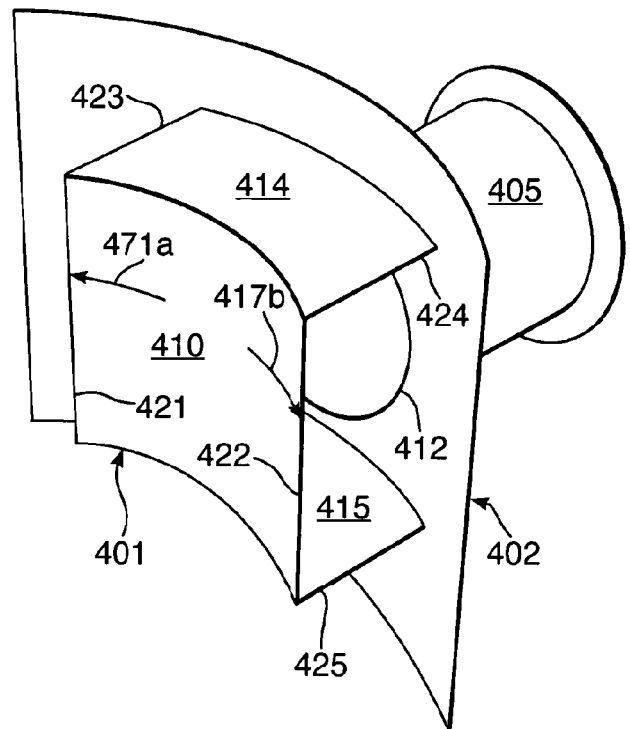
FIG. 9 shows schematically splash plate inlet device.

Reference is made to FIG. 9 showing a conventional splash plate inlet device 401 in a vertical column 402, of which merely part of the wall near the inlet nozzle 405 is shown.

The splash plate inlet device comprises a splash plate 410 which is a guide member mounted in front of the inlet end 412 (outlet of nozzle 405). The splash plate is mounted on the column wall via top and bottom plates 414,415.

During normal operation, a gas-liquid mixture streams through the inlet nozzle 405. The gas is deflected laterally and split into two lateral streams, flowing along the main directions of gas flow 417a,417b at either side of the splash plate 410. Liquid droplets impinge on the splash plate and typically form a liquid film thereon, even though the splash plate is slightly curved with its convex side facing the inlet end 412. The interaction between liquid droplets and the receiving surface of the splash plate depends on the type of liquid, but also on the pressure in the column. It is know, for example, that in high-vacuum columns liquid droplets are much less spattered than at higher pressures, and easily form a liquid film.

Liquid flows laterally on the splash plate towards vertical rims 421, 422. Gas flowing along the surface will re-entrain liquid at the vertical rims. Liquid will also flow onto the inner surfaces of the top and bottom plates 414, 415, and also there re-entrainment will happen at the rims 423,424,425.

Figure 10:
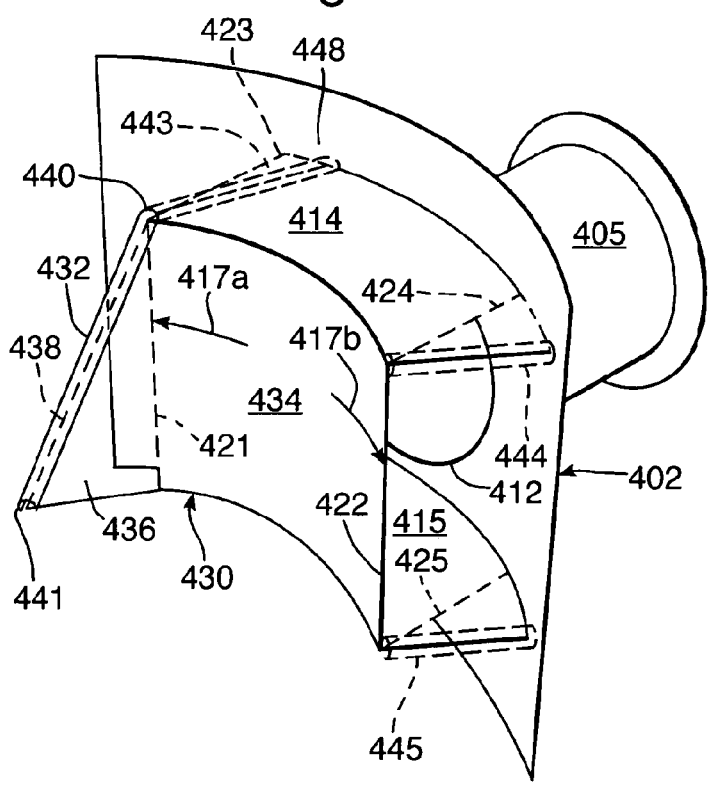
FIG. 10 shows schematically a splash plate inlet device according to a further embodiment of the invention.

FIG. 10 shows a splash plate inlet device 430 with a catcher channel 432 in accordance with the invention. The guide member, splash plate 434, is provided with a substantially triangular end part 436, the inclined rim 438 of which is provided with catcher channel 432. The catcher channel 432 extends from an upstream position, at the upper corner 440 of the splash plate to a downstream position 441 with respect to the main direction of gas flow 417a. The virtual line along rim 438 deviates from the main direction of gas flow 417a.

Features of the catcher rims as discussed with reference to FIGS. 2-7 can be applied analogously in this embodiment. Where reference to a vane is made, this is to be read as reference to a guide member, in particular to a splash plate.

The liquid film that is formed on the splash plate is flowing downstream towards the rim 438, where it enters into the catcher channel and is guided to the downstream end at 441 from where it is discharged.

The wing part 436 can be connected such as welded to a rim 421 of the original splash plate, or it can be integrally formed therewith.

At the other lateral side of the splash plate 434, at rim 422, suitably also a wing part with catcher rim according to the invention is arranged. This is not shown in FIG. 10.

Optionally the rims of the upper and/or lower plates 414, 415 can also be provided with catcher channels. Several options are indicated at 443,444,445. Channel 443 can be an extension in fluid communication with channel 432. In this case the end 448 of the channel 443 at the column wall is suitably at a more upstream position than 440, so that liquid flows towards the downstream end 441. To this end, the corner of the upper plate towards the wall can be cut off as shown, wherein the position of rim 423 as in FIG. 9 is indicated for comparison.

Another option is shown with channels 444 and 445, that are mounted on triangular end parts of upper and lower plates 424 and 425. These channels discharge liquid towards the wall of column 402. The end parts can be integrally formed or retrofitted.

The upstream ends of the catcher channels are suitably closed.

Figure 11:
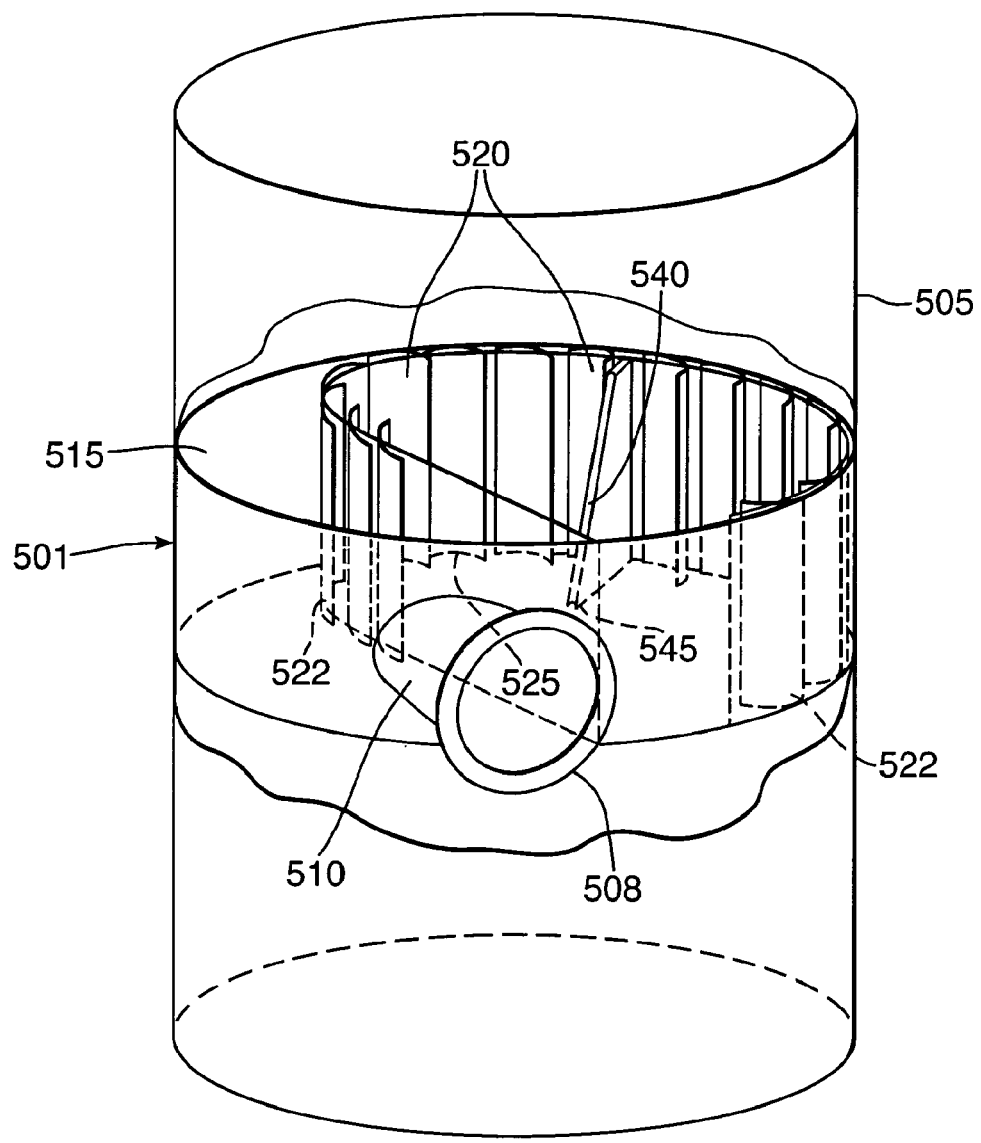
FIG. 11 shows schematically another embodiment of the invention in the form of a vapour horn inlet device.

Reference is made to FIG. 11, schematically showing a perspective view of another type of fluid inlet device, which is commonly referred to as 'vapour horn'. With this inlet device 501 the fluid mixture is tangentially introduced into the vertical column 505 through nozzle 508. From the inlet end 510 at the nozzle 508, a curved inlet flow channel 515 extends in downstream direction, substantially conforming to the inner circumference of the column 505. A plurality of curved guiding vanes (guiding members) 520 are arranged one behind the other along the curved inlet flow channel. Each vane comprises an intercepting part 522 extending in upstream direction of the curved inlet flow channel, towards the inlet end 510. Each vane further comprises an outwardly (out of the fluid inlet device towards the centre of the vessel) directed deflecting part 525.

The deflecting parts 525 define a convex and a concave side of each vane. The concave side, towards which the fluid is deflected and on which a flowing liquid film is formed during normal operation, generally faces towards the centre of the column. The leading and trailing ends of a vane can be planar, but each or both of them can also be curved. The main direction of gas flow along the concave side of the vanes will be in the horizontal plane in the configuration as shown in FIG. 11.

According to the invention, at least one, but suitably a plurality or all vanes 520, are provided with liquid catcher channels. In FIG. 11 this is illustrated only on one of the vanes 520 that is provided with a liquid catcher channel 540.

The vanes 520 are substantially similar to the vanes 20 discussed with reference to FIG. 1, and the variants and optional features of vanes with catcher channels discussed with reference to FIGS. 2-7 are analogously applicable to the embodiment of FIG. 11.

During normal operation of the fluid inlet device 501 a mixture of gas and liquid is supplied through the inlet nozzle 508 via the inlet end 510 into the circumferentially extending curved channel 515. Each of the vanes 520 intercepts part of the feed stream and deflects it laterally out of the channel, towards the centre of the column 501. The first vane, i.e. the one nearest the inlet end 510 is so arranged in the mixed feed stream that it intercepts and deflects part of the feed stream, while the remaining part of the feed stream continues along the inlet channel 515. This remaining part meets successively the subsequent vanes each of which intercepts and deflects a portion of the feed stream; the leading edge of each subsequent vane is arranged such that the stream becomes steadily smaller and the channel narrows until the last vane.

Since the vanes have a curved shape the consequence of the inertia and centrifugal force is that the liquid particles strike the vane surface, and that a separation between liquid and vapour is simultaneously effected. The liquid collects to a considerable liquid stream on the concave surface of the vanes.

At the downstream end of the vane, liquid will be caught in the channel(s) 540 and guided towards the downstream end 545 of the liquid catcher channel, and released into the column in downward direction. In this way the re-entrainment by cross-flowing gas is suppressed, in substantially the same way as discussed hereinbefore.

The vapour horn can also be downwards blowing, in which case the vanes are arranged so that they deflect the flow from the horizontal plane downwardly. The catcher channels in this case are suitably arranged such that the liquid is guided towards the wall of the column, however other configurations such as the one shown in FIG. 8 are also possible.

Guide members of yet other fluid devices can also be provided with liquid catcher channels according to the invention. Clearly, any fluid inlet device including curved vanes for pre-separating and guiding the liquid stream can be provided with catcher rims analogously to the embodiments discussed hereinabove. The curved vanes can be arranged in different configurations, e.g. splitting and deflecting the inlet stream into a plurality of different directions even in different planes.

Figure 12A:
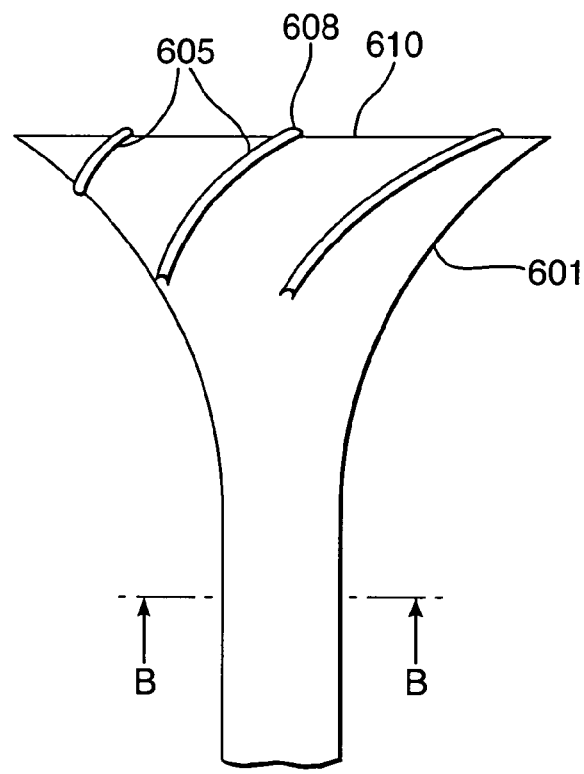
FIG. 12 shows schematically yet another embodiment of the invention with trumpet-like vanes in side view (A) and bottom view (B).
Figure 12B:
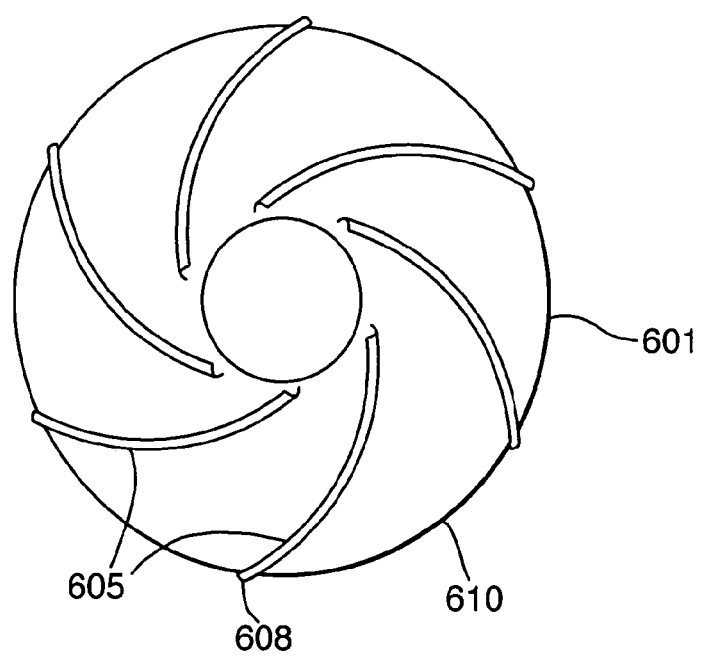

Catcher channels can also with advantage be provided on an inlet device known in principle from International Patent application with publication No. WO 03/070348. This fluid inlet device comprises a series of coaxially disposed circumferential vanes, wherein each circumferential vane curvedly extends between an intercepting part having a substantially axially directed leading edge and a deflecting part having a substantially radially outwardly extending trailing edge, and wherein the central axis of the inlet device extends parallel or coaxial with an upwardly extending axis of a treating zone in a vessel or column. FIG. 12 shows a side view (A) and a bottom view (B) of such a trumpet-like vane 601. The outer surface of the vane is the (concave) side on which a liquid film is formed during normal operation. The main direction of gas flow is upwards in a vertical plane of FIG. 12A and conforms to the surface of the circumferential vane. Liquid catcher channels 605 are shown, which are mounted on the outer surface, and which spiral partially around the vane 601, and therefore deviate from the main direction of gas flow. The catcher channels 605 overlap, so that all liquid is captured. The downstream end 608 of a catcher channel can be straight and open such that liquid is released upwardly into the open space surrounding the vane, but it can also be arranged such that the liquid is discharged towards the inner surface of interior of the vane, e.g. bent over the top rim 610. In that case (not shown in the drawing) liquid can be withdrawn from the bottom of the vane.

Liquid catcher channels can be made from any suitable material, suitably from the same metal as the vane, and can be connected to or integrated with the vane using known techniques including welding, bolting, bending.

By reducing the amount of entrained liquid carried upwards with the gas in accordance with the present invention, the separation duty on the internals above is minimized.

The fluid inlet device of the present invention can with advantage be used in a high vacuum distillation column. Typically in such columns, the feed mixture comprises 30-50 wt % of liquid. It has been found that at inlet velocities exceeding 100 m/s liquid entrainment can become large, so that the relative fraction of the total liquid entering the fluid inlet device and that is carried along with the gas upwardly exceeds 10%. At higher inlet velocities the entrainment is even higher. High entrainment figures represent a problem for the wash beds that are typically installed above the fluid inlet device. The present invention reduces the entrainment significantly.

The fluid inlet device of the present invention can also advantageously be used in a separation vessel. The better the overall separation efficiency of the inlet device, the easier the task for other separation internals in the column, such as a coalescer, mesh pad, vane pack, or centrifugal liquid separator (swirl deck, cyclone, multicyclone). This will allow to relax design criteria for such other internals and/or allow higher throughput and/or allow to build smaller and/or cheaper separators.

The vessel can be a vertical column, but also another type of vessel.

EXAMPLE

A fluid inlet device generally according to FIG. 1 was tested before and after retrofitting with liquid catcher channels in accordance with the invention. The fluid inlet device was horizontally mounted in a column of 1 m diameter, generally as shown in FIG. 1, but in a dual ladder configuration with 28 vanes in total, 14 vanes on either side arranged in two stacked rows of 7 vanes each. Each vane was 0.144 m high, and the feedpipe to the column inlet had a diameter of 0.28 m.

The fluid inlet device was tested before mounting of liquid catcher channels. A water/air mixture was fed to the feed pipe in which the water was dispersed in the air as droplets with a size as is typically present in transfer lines to high vacuum units. Tests were conducted over a range of air inlet velocities of 30-60 m/s, and using a water to air mass ratio of 0.3.

The amount of entrainment in the gas was determined by using a vanepack mounted above the vane inlet device. The water caught in the vanepack was drained and the amount was measured. Entrainment can be defined as the weight of liquid recovered by the vane pack per volume of gas.

Then the fluid inlet device was equipped with triangular vane end parts as in 87 (FIG. 5) with an equal height and length of 0.144 m, so that a rim at 45 degrees with the horizontal main direction of gas flow was obtained. Along this rim a catcher channel 83 was arranged, thereby also having a 45 degrees angle with the main direction of gas flow. The length of the channel part 83 was 0.22 m. The channel extended further along the horizontal upper rim of the original vane to the top wall plate of the fluid inlet device, as shown with reference numeral 85 in FIG. 5.

The catcher channel had a shape 121 as shown in FIG. 7. The diameter of the half circular tubular in top was 10 mm. The size of the slit on the concave side of the vane between the upper rim of the vane and the rim of the channel was 3 mm.

Tests performed after installation of the catcher channels in accordance with the invention, using otherwise identical conditions, showed that the entrainment was reduced by a factor 2 to 3, or even higher, over the range of air inlet velocities.

That which is claimed is:

1. A fluid inlet device suitable for introducing a mixture of liquid and gas into a vessel, which fluid inlet device comprises an inlet flow channel having an inlet end for receiving the mixture of liquid and gas; a guide member placed along the inlet flow channel having a rim and a surface, on which surface a liquid film is present during normal operation, and having a main direction of gas flow along the surface of said guide member; and wherein the guide member is provided with a liquid catcher channel which extends along at least part of the rim of the guide member and also extends from an upstream position with respect to the guide member to a downstream position, and wherein the liquid catcher channel extending along the guide member is slanted between the upstream position and the downstream position such that the slant deviates from the main direction of gas flow along the surface of said guide member by an angle of at least 10 degrees to not larger than 75 degrees.

2. The fluid inlet device according to claim 1, having an inlet end for receiving the mixture of liquid and gas; wherein the guide member provided with said liquid catcher channel is a curved guiding vane comprising an intercepting part extending towards the inlet end, and a deflecting part defining a generally convex side and a generally concave side of the curved vane, the concave side representing the surface on which liquid is present during normal operation.

3. The fluid inlet device according to claim 2, wherein the fluid inlet device is a vapour horn inlet device having a curved inlet flow channel with the inlet end at its upstream end; and
a plurality of curved guiding vanes placed one behind the other along the curved inlet flow channel, and
wherein at least one of the curved guiding vanes is provided with said liquid catcher channel.

4. The fluid inlet device according to claim 2, having an inlet flow channel with the inlet end at its upstream end; and
a plurality of curved guiding vanes placed one behind the other along the inlet flow channel,
wherein the deflecting parts of two consecutive vanes form an outlet channel of the inlet device, and
wherein at least one of the curved guiding vanes is provided with said liquid catcher channel.

5. The fluid inlet device according to claim 2, comprising a plurality of curved guiding vanes of which the deflecting parts extend into a plurality of different directions, and wherein at least one of the curved guiding vanes is provided with said liquid catcher channel.

6. The fluid inlet device according to claim 2, wherein the curved guiding vane is provided with a plurality of said liquid catcher channels.

7. The fluid inlet device according to claim 1, wherein the fluid inlet device is a splash plate inlet device and the guide member is a splash plate provided with at least one of said liquid catcher channels.

8. The fluid inlet device according to claim 1, wherein the slant between the upstream and downstream position deviates from the main direction of gas flow by an angle of at least 20 degrees and at most 65 degrees.

9. The fluid inlet device according to claim 1, wherein the main direction of gas flow during normal operation is horizontal, wherein the guide member extends between upper and lower rims, wherein the upstream position is at a first distance from the lower rim, and wherein the downstream position is at a second, smaller, distance from the lower rim.

10. The fluid inlet device according to claim 1, wherein the fluid inlet device is a downwardly flowing fluid inlet device and the guide member is provided with two of said liquid catcher channels.

11. The fluid inlet device according to claim 1, wherein the slant between the upstream and downstream position deviates from the main direction of gas flow by an angle of at least 30 degrees and at most 60 degrees.

12. A method of retrofitting a fluid inlet device suitable for introducing a mixture of liquid and gas into a vessel, which fluid inlet device comprises a guide member having a surface on which surface a liquid film is present during normal operation, and having a main direction of gas flow along the surface; which method comprises providing the guide member with a liquid catcher channel which extends along at least part of the rim of the guide member and also extends from an upstream position with respect to the guide member to a downstream position, and wherein the liquid catcher channel extending along the guide member is slanted between the upstream position and the downstream position such that the slant deviates from the main direction of gas flow along the surface of said guide member by an angle of at least 10 degrees to not larger than 75 degrees.

13. The method according to claim 12, wherein the guiding member is a vane and the step of providing at least one of the guiding members with a liquid catcher channel comprises connecting to the vane a vane end part wherein at least part of the liquid catcher channel is arranged on the vane end part.

* * * * *